May 7, 1935.　　　　　A. MOORE　　　　2,000,091
PRESSURE DELIVERY OF FUEL IN INTERNAL COMBUSTION ENGINES
Filed Oct. 24, 1927　　　5 Sheets-Sheet 1
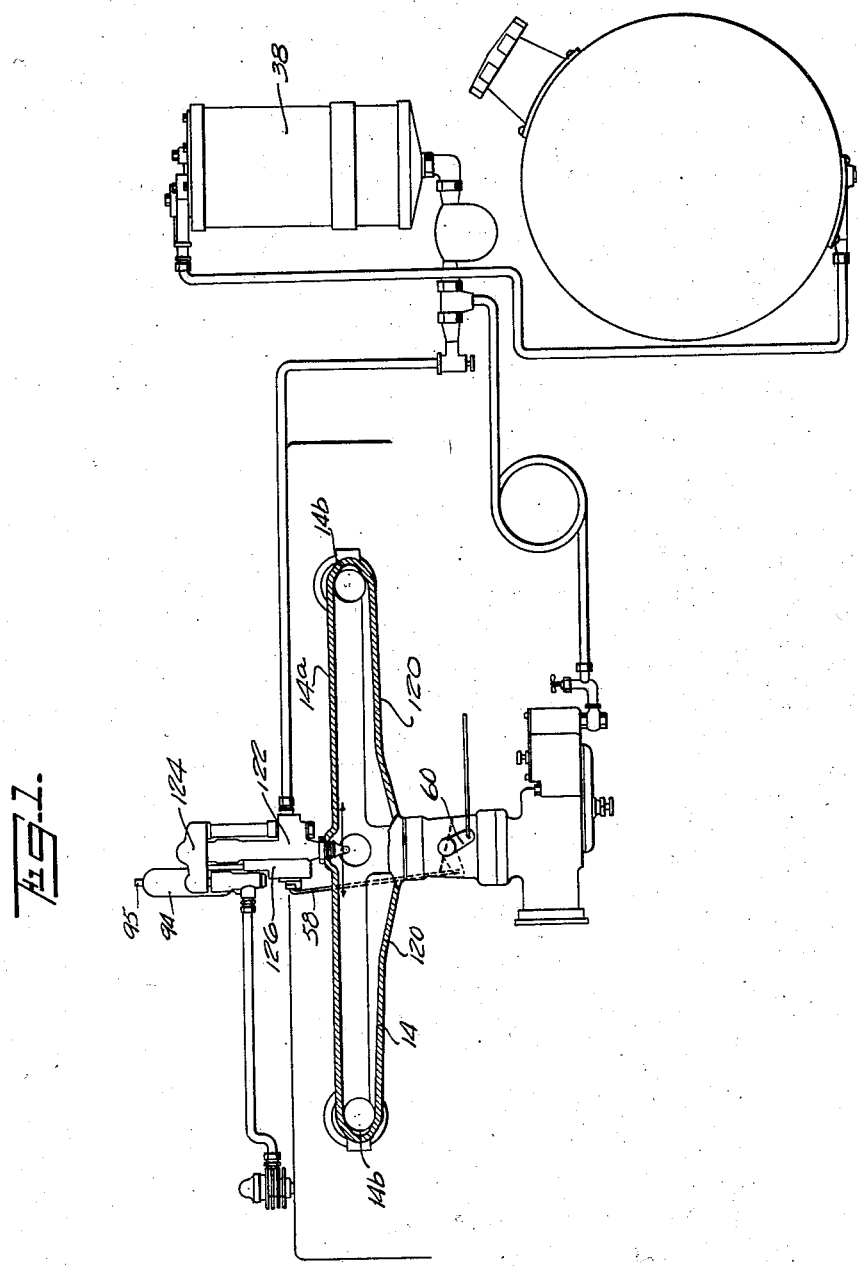
INVENTOR
Arlington Moore
BY
Dyke and Schaines
ATTORNEYS

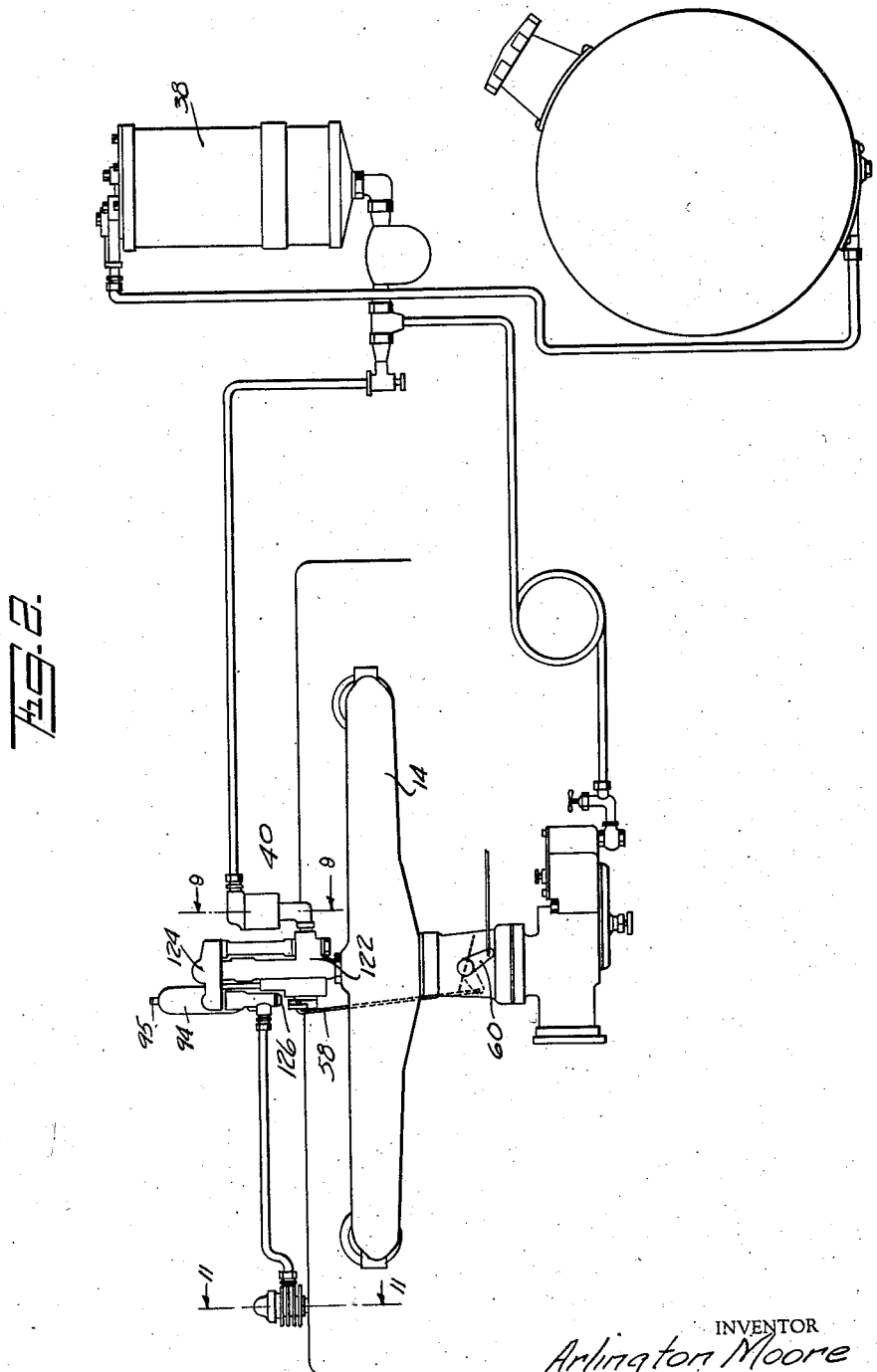

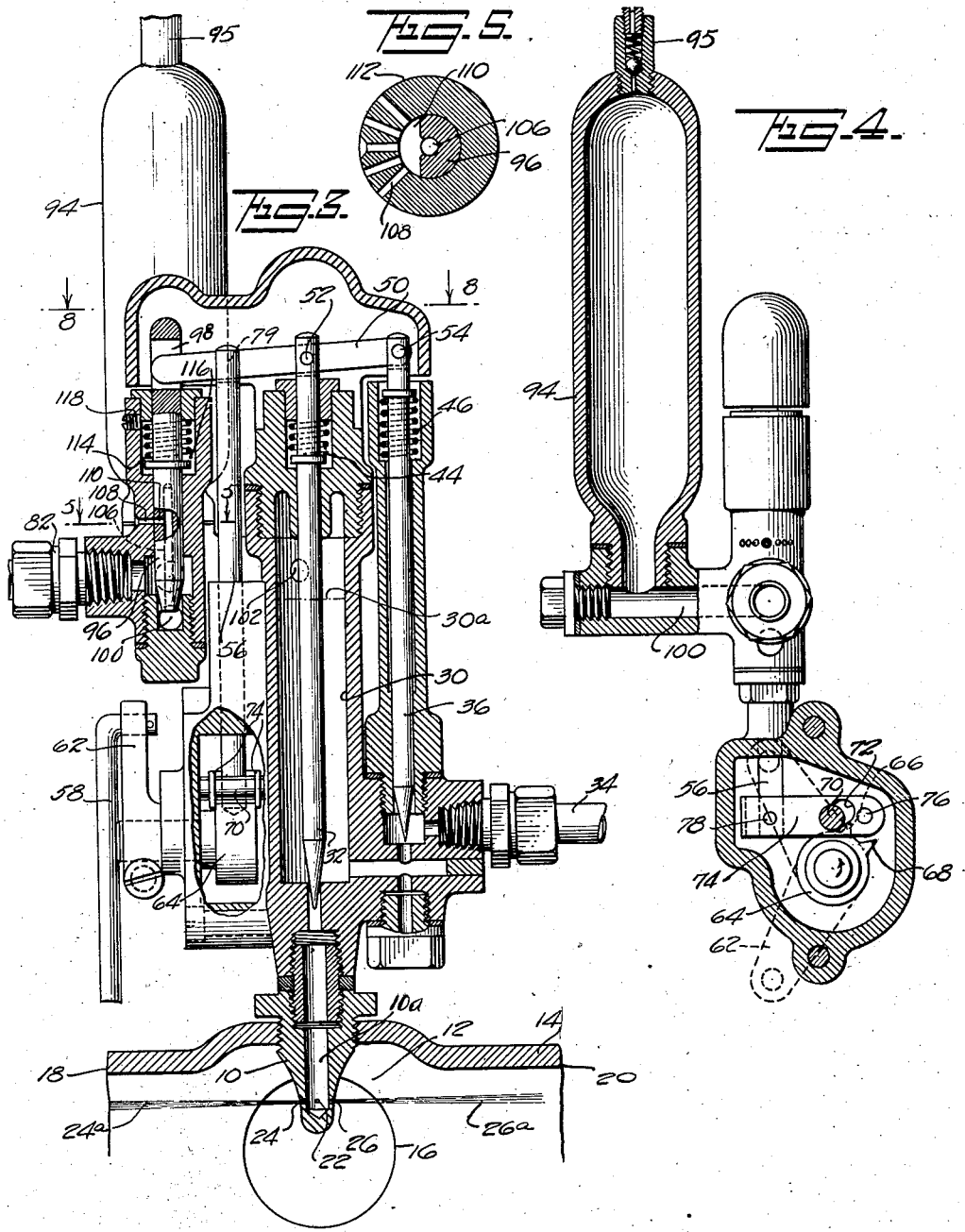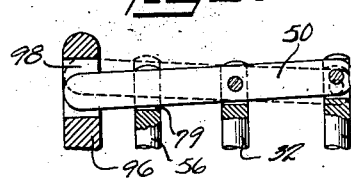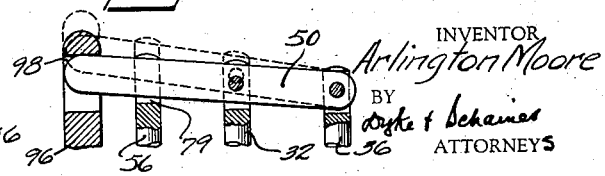

May 7, 1935. A. MOORE 2,000,091
PRESSURE DELIVERY OF FUEL IN INTERNAL COMBUSTION ENGINES
Filed Oct. 24, 1927 5 Sheets-Sheet 4
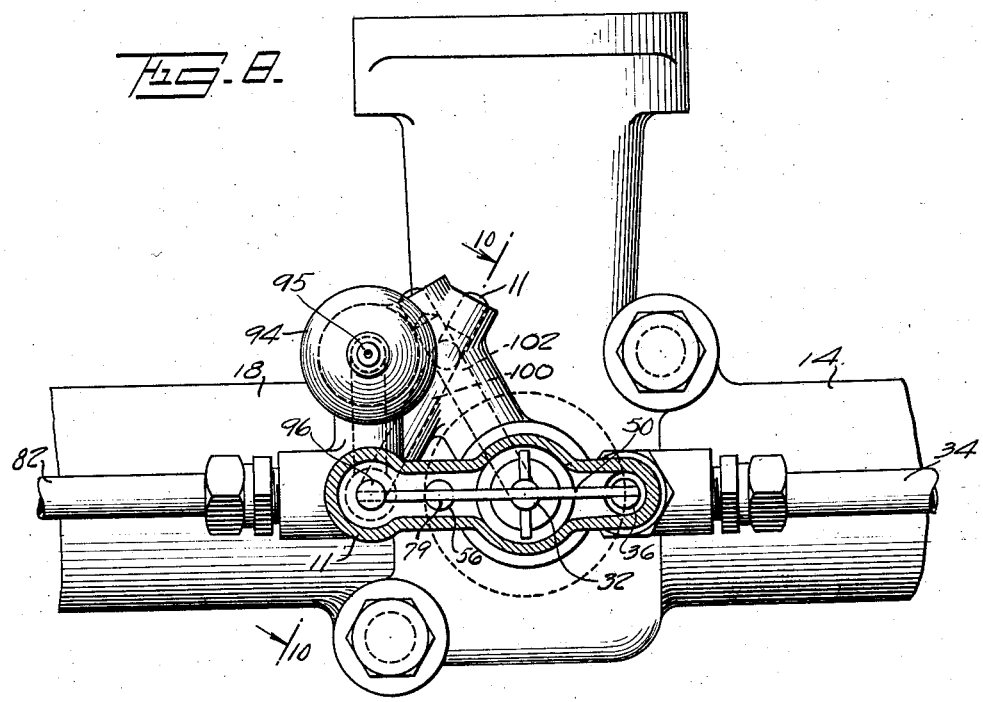
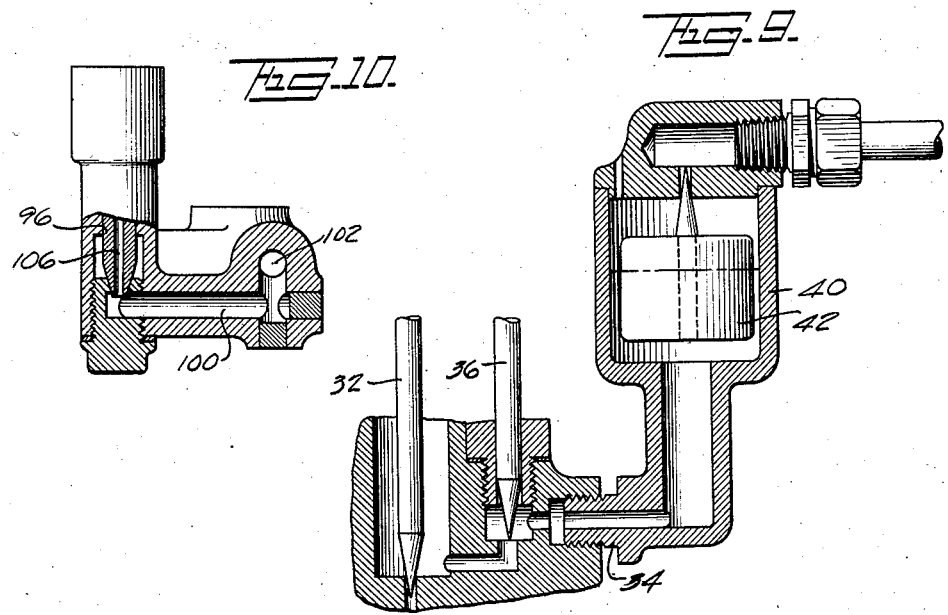
INVENTOR
Arlington Moore
BY
Dyke and Behaines
ATTORNEYS

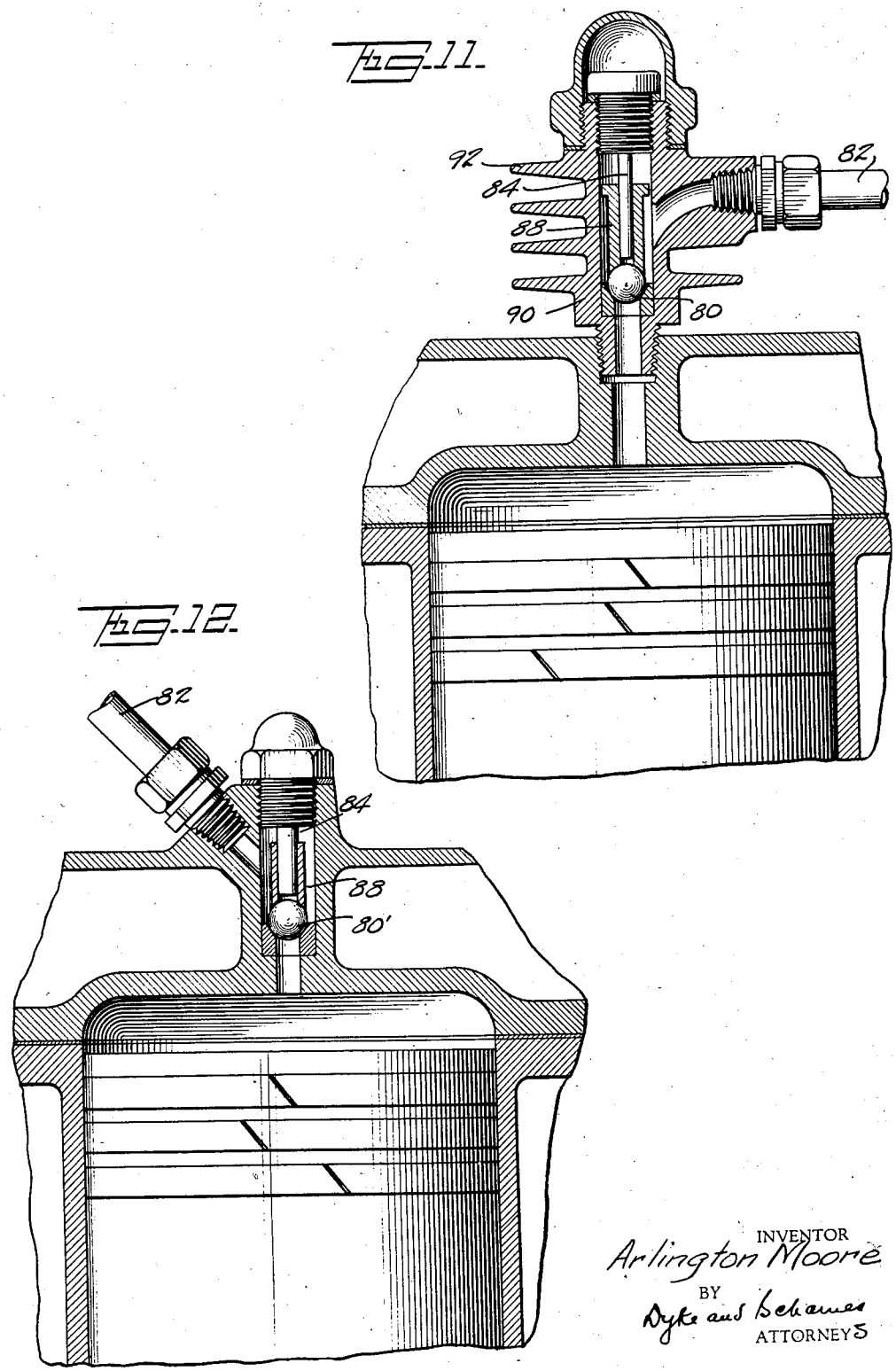

Patented May 7, 1935

2,000,091

UNITED STATES PATENT OFFICE 2,000,091

PRESSURE DELIVERY OF FUEL IN INTERNAL COMBUSTION ENGINES

Arlington Moore, New York, N. Y., assignor, by mesne assignments, to Maxmoor Corporation, New York, N. Y., a corporation of Delaware Application October 24, 1927, Serial No. 228,210

35 Claims. (Cl. 123—127)

My invention relates to a method of and means for improving the operation of internal combustion engines at accelerating periods.

It is characteristic of the ordinary internal combustion engine that, while it can be operated with fair efficiency at sustained high or low speeds, transition from low to high speed is accompanied by fuel impoverishment and temporary poor operation. This is especially objectionable in automobile engines, in which rapid acceleration is required. Attempts to accelerate by opening the throttle temporarily reduce the fuel lifting capacity, and it is not until the engine speed and the velocity of incoming air increase considerably that this condition is overcome and the fuel is adequately conveyed by the air to properly charge the engine cylinders, and while the desired acceleration is ultimately obtained, it is obtained only after considerable initial delay or hesitation because of fuel impoverishment during such periods of temporary low air velocity. At such times of fuel impoverishment during engine acceleration, detonation knocking is commonly produced. This condition can exist to quite a considerable extent even if the carburetor contains provision for delivering an extra stream of fuel at or near the carburetor throat upon opening the throttle for acceleration, as the air supplied through the partly vertical and relatively long passages between the carburetor and the engine cylinders including the intake riser and the manifold branches will temporarily run ahead of the fuel supply.

In the ordinary present-day automobile engine such acceleration as is secured is dependent very largely on the fact that the engines are run on wet mixtures, and pools of liquid fuel accumulate in the manifold, which are swept into certain cylinders upon opening the throttle for acceleration. Acceleration so obtained, however, is accompanied by unevenness of engine operation, vibration, unequal distribution, carbon accumulation, waste of fuel and dilution of lubricating oil.

With my invention, which is not dependent upon the speed of the air stream toward the engine cylinders for fuel lifting, but supplies the requisite quantity of fuel in a pulverized pressure-driven stream at or substantially at the intake ports of the engine immediately upon opening the throttle for acceleration, lively acceleration is obtained with none of the sacrifices which have been referred to, and the engine can be readily started in all weathers without resorting to objectionable choking.

In the accompanying drawings I have shown apparatus for performing the new process. In said drawings:

Fig. 1 is a schematic elevational view showing apparatus for supplying fuel at acceleration periods which is dependent upon the fuel level in the vacuum tank.

Fig. 2 is a view similar to Fig. 1, but showing apparatus containing separate means for regulating the fuel level for supply of fuel at periods of acceleration.

Fig. 3 is a vertical sectional view of means for controlling supply and pressure delivery of fuel to the intake ports.

Fig. 4 is a section taken at a right angle to the section plane of Fig. 3.

Fig. 5 is a transverse section on the line 5—5, Fig. 3.

Figs. 6 and 7 are detail part sectional views showing different stages in the actuation of the auxiliary fuel supply means.

Fig. 8 is a section on the line 8—8, Fig. 3.

Fig. 9 is a sectional detail view of the fuel level control means of Fig. 2 and taken substantially on the line 9—9, Fig. 2.

Fig. 10 is a detail sectional view taken on the line 10—10, Fig. 8.

Fig. 11 is a detail sectional view taken on the line 11—11, Fig. 2, and

Fig. 12 is a similar view showing a modification.

The pressure fuel nozzle 10 (Fig. 3) as shown herein extends downwardly from above into the diffusion chamber 12 of the intake manifold 14. In the case of a six-cylinder engine, having the short central branch 16 and the longer branches 18, 20 radiating from the diffusion chamber 12, pressure fuel nozzle 10 has fine orifices 22, 24 and 26 directed substantially axially of each of the manifold branches so that when liquid fuel is supplied under sufficient pressure it is driven in finely pulverized streams as 24a, 26a into or directly in front of the entrances to the several intake valve ports. The orifices 22, 24, 26 are preferably arranged slightly above the central axis of the manifold passage so as to permit of a slight arc of movement of the fuel stream to insure adequate suspension of the streams 24a, 26a until the same impinge upon the end walls 14b of the manifold.

The bore 10a of the pressure fuel nozzle 10 communicates with a fuel receptacle or well 30. Delivery of fuel to the pressure fuel nozzle is controlled by a needle valve 32, and supply of fuel to the receptacle 20 through a pipe 34 leading from a source of fuel supply is controlled by a needle valve 36. The source of fuel supply may, for example, be a vacuum tank 38 (Fig. 1) or a separate constant level float chamber 40 and float 42 may be provided for this purpose (Figs. 2 and 9). Spring 44 tends to close delivery valve 32, and spring 46 tends to open supply valve 36, so that supply valve 36 is normally open and delivery valve 32 is normally closed, as shown in Fig. 3, and the fuel can rise in well 30 to the fuel supply level 30a, as indicated in dotted lines in said Fig. 3.

The arrangement is such that in order to open delivery valve 32, supply valve 36 must first be closed. This result can be secured by making spring 46 relatively flexible and spring 44 relatively stiffer, so that when lever 50, pivoted to valve 32 at 52, and to valve 36 at 54, is raised by its actuating rod 56, supply valve 36 must be seated before a fulcrum can be established at 54 for lifting delivery valve 36. With proper venting (hereafter referred to), upward movement of rod 56 will thus operate to permit discharge of fuel from well 30 through passage 10a while the supply passage is shut off by valve 36 being closed, and return or downward movement of actuating rod 56 will serve to restore the ports to the position shown in Fig. 3, whereupon the supply of fuel in well 30 will be replenished substantially instantaneously.

Provision is made for raising rod 56 to actuate lever 50 when the throttle is opened. This result can be secured by cam means interconnected with the throttle. In the construction shown, the link 58 from the throttle crank 60 is connected to the crank 62 of cam 64 which has a cam nib 66 coming into operation momentarily at partial throttle openings, to cause the injection, in manner described below, of relatively small quantities of fuel to points adjacent to the several inlet ports, and a cam nib 68 coming into operation at and near wide open position of the throttle to cause the injection of a second charge of fuel. The amount of fuel injected depends on the length of time that the valve 32 is held open, and this may be controlled, as desired, by proper manipulation of the throttle, particularly when starting the engine, to maintain the nib 66 in action until the required fuel is supplied. The exact amount of fuel necessary to achieve the desired result may thus be supplied without using an excessive amount.

Cam nibs 66 and 68 engage a roller 70 received in inclined slots 72 in a double sided lever 74 pivoted at 76. Actuating rod 56 is pivotally attached to lever 74 at 78 and engages lever 50 by the latter being received in a notch or slot 79 provided in the upper end of rod 56. Opening of the throttle operates through link 58 to turn the cam 64 in the direction of the arrow on Fig. 4, and roller 70 being thereby frictionally advanced to the lower limit of slots 72 causes lever 74 to lift and thereby to lift actuating rod 56 when roller 70 is engaged by cam nib 66, or by the cam nib 68.

Upon closing movement of the throttle and corresponding movement of cam 64, the roller 70 runs up in the slots 72 without actuating lever 74, valves 32 and 36, so that well 30 is not opened up to the intake upon decelerating or closing the throttle, at which time there is no need for auxiliary fuel supply. Any very slight closing movement of the throttle will thus shut off the acceleration fuel supply and by gauging the retraction or partial retraction of the throttle control, as can readily be done by the driver, the quantity of acceleration fuel delivered can be easily controlled to discharge the entire contents of the well or any lesser part thereof, as may be desired.

The arrangement so far described (with proper venting) will give a supply of fuel under gravity head at the openings in pressure fuel nozzle 10 upon opening the throttle for acceleration.

In order to ensure that air entering the cylinders at periods of opening the throttle for acceleration will be accompanied (not followed) by its proper complement of fuel, I provide pressure means for putting a pressure on the fuel in well 30 when valve 32 is opened and thereby securing pressure delivery of fuel in pulverized stream form at or in front of the intake ports.

Engine cylinder pressure is preferably utilized for this purpose. A variety of arrangements for this purpose may be made use of, and preferably include a check valve. In Fig. 11 a ball check 80 permits cylinder gases while under compression and combustion pressures to pass out through the pipe 82, the movement of the ball check 80 being limited by the adjustable pin 84 and guided in relation to its seat 86 by a sleeve 88. The valve casing 90 in this form is located over the cylinder head and has fins 92 for air cooling. With the alternate arrangement of Fig. 12 the ball check 80' is water cooled by having its casing formed in the water jacket of the cylinder head. The check valve parts are desirably made of metal such as Silcrome steel adapted to withstand high temperatures and to resist rusting and corrosion.

Pipe 82 communicates with a pressure storage bell 94 in which gaseous pressure is maintained by the check valve. Bell 94 is preferably provided with a pressure relief valve 95.

A valve 96 serves the double purpose of communication from the source of gaseous fluid under pressure to the space over the fuel in well 30 when delivery valve 32 is opened, and at other times serves for venting well 30 to the atmosphere, thereby permitting this fuel well to be replenished.

The lever 50 actuated by rod 56, as already described, has a lost motion connection with valve 96, as by being passed through an elongated opening 98 in the stem of valve 96.

As will be seen from the dotted line showing in Fig. 6, supply valve 36 is closed upon the first upward movement of actuating rod 56. Fig. 7 shows how further movement of rod 56 serves to open delivery valve 32 and also to raise the pressure control valve 96 from its seat, permitting the gaseous fluid under pressure to pass from pipe 82 and bell 94 through passages 100 and 102 into the upper part of well 30 and to forcibly squirt the fuel in liquid streams, as 24a, 26a, through the openings 22, 24 and 26 of pressure fuel nozzle 10 directly into the entrances to the several intake valve ports.

This delivery of fuel in a finely pulverized stream will continue so long as valves 32 and 96 are held open. This is only momentary during engine operation, as by cam nib 66 coming into play as the throttle is partially opened, or upon further throttle opening upon changing, as from part throttle opening to approximately wide open throttle position, the second nib 68 comes into play and fuel is injected to ensure getting proper mixture during the period of change from lower to higher power operation.

As soon as the throttle is retracted at all and cam 64 moved backwardly, however slightly, roller 70 will ride up in slots 72, permitting lever 74 and actuating rod 56 and lever 50 to drop. This not only closes valves 96 and 32 and opens supply valve 36, but establishes a vent from well 30 through passages 100, 102 and the bore 106 of valve 96 and the side vent openings 108 leading to the atmosphere, so that, the supply valve 36 being open, the fuel in well 30 rises to the level of the fuel source and replenishes the supply for use during the next accelerating period. The fuel emptied from chamber 30 by the action of the first nib 66 is also replenished upon further opening movement of the throttle, the roller 70 then being located between the nibs 66 and 68 and the valve 36 opened to effect the replenishment. It will be observed that the atmospheric vent is closed by raising valve 96, the passages 110 in valve 96 and 108 in the valve housing 112 being thereby put out of register. The spring 114 tends to hold valve 96 closed, and spring chamber 116 may be filled with heavy oil through screw hole 118, and this oil serves both to lubricate the parts and to seal their preferably lapped-in working surfaces against leakage.

While my process of auxiliary fuel supply can be used with substantially any intake manifold and the fuel supply for acceleration can be correctly gauged, as for example, by proper size of jet openings 22, 24 and 26, I preferably make use of an intake manifold 14 containing drain passages 120 leading gradually down from the elbows in those branches which contain elbows, so that fuel cannot accumulate in pools on the floor of the intake passage, but is carried or drained back into, and to form part of, the general charge stream going to all the engine cylinders.

With my invention it is not necessary to close the throttle between successive periods of acceleration, opening movement of the throttle after nib 66 releases and any backward throttle and cam movement, however slight, operating to replenish the auxiliary fuel well and to reset the valves ready for reuse in the manner described.

The apparatus used to carry out my process may take various forms. Preferably the working parts are supported or housed in a casing 122 supported on the intake manifold by means of the tubular connection 10a and covers 124 and 126 are provided to enclose the working parts and prevent tampering therewith.

The apparatus described supplies fuel for starting, and dispenses with the customary choke used in automobile engines, and prevents the cylinder flooding incident to use of a choke. Upon slightly opening the throttle, the lifting of lever 50 by the cam nib 66 produces a supply of fuel through the openings in pressure fuel nozzle 18, the cylinder compression pressure obtained by turning over the engine with the starting motor being sufficient to provide an adequate supply of fuel to the intake manifold near the valve ports for engine starting.

By my invention the auxiliary fuel in predetermined or definite amounts is ejected from the relative small orifices by the imposition of a gaseous pressure (the compression and combustion pressure of the heated gases from the engine cylinders) thereon which is greater than atmospheric pressure, so that the streams or jets of fuel are capable of traveling with considerable force and distance to points in close proximity to all of the inlet valve ports of the cylinders, even the most remote thereof, the supply of auxiliary fuel for its flow to the cylinder ports being independent of manifold depression or air velocity.

This supplemental supplying of fuel which takes place upon the first partial opening and again on further opening the throttle, is independent of the engine speed at the instant of opening the throttle for acceleration. If the initial engine speed is low, the air velocity past the main fuel jet may be insufficient to lift the fuel, and the mixture will be impoverished for this reason, thus requiring the supplementary fuel to increase the fuel component of the engine charge and get quick acceleration without any "stumbling" of the engine. The opening of the throttle also causes the more fluent air to momentarily run ahead of the minute fuel droplets, which are denser and heavier than the air, resulting in temporary impoverishment of the mixture, at the higher engine speeds as well as lower speeds, and this even though at the higher speeds the velocity of the air past the fuel jet is sufficient to lift the fuel from the jet. It is therefore apparent that it is advantageous, in general, to supply supplementary fuel every time the throttle is moved in the direction for opening sufficiently to bring either or both of the cam surfaces into action, and this irrespective of the initial or original speed of the engine.

I claim:

1. The herein described method of improving the operation of internal combustion engines during accelerating periods which consists in releasing fuel upon acceleration for supplying same to the engine by gravity flow for supplementing the main charge of fuel and air when the same is in an impoverished mixture state, and thereupon releasing a gas and imposing a gaseous pressure greater than atmospheric pressure upon the head of said fuel for augmenting the effects of gravity thereon and for effecting the delivery of said fuel into said engine at points in proximity to the inlet valve ports thereof.

2. The herein described method of improving the operation of internal combustion engines during accelerating periods which consists in imposing the pressure of the gases and products of combustion from the engine cylinder upon a head of auxiliary fuel, and effecting the delivery thereof under said pressure into the air at a point in advance of the point of introduction of main fuel, whereby to supplement the main charge of fuel and air when the same is in an impoverished mixture state.

3. The herein described method of improving the operation of internal combustion engines during accelerating periods which consists in imposing a gaseous pressure upon a head of auxiliary fuel and delivering the same at accelerating periods under said pressure to the engine, and reducing the pressure upon said fuel at the intervals between deliveries thereof to the engine to permit of the replenishment of said fuel.

4. The herein described method of improving the operation of internal combustion engines during accelerating periods which consists in delivering fuel under gaseous pressure to the engine for supplementing the main charge of air and fuel during acceleration periods, and replenishing said fuel under atmospheric pressure at intervals between the deliveries thereof to the engine.

5. The herein described method of improving the operation of internal combustion engines during accelerating periods which consists in imposing the pressure of the gases and products of combustion from the cylinders upon a head of fuel for effecting the delivery thereof into the engine whereby to supplement the main charge of fuel and air when the same is in an impoverished mixture state, and replenishing said fuel under atmospheric pressure at intervals between the deliveries thereof to the engine.

6. The herein described method of improving the operation of internal combustion engines during accelerating periods which consists in taking the gases and products of combustion under pressure from the engine cylinders, imposing the pressure thereof upon a head of fuel, forcing said fuel under said pressure towards the several inlet valve ports of the engine, and delivering said fuel in jets at points in proximity to said valve ports, whereby to supplement the main charge of air and fuel when the same is in an impoverished mixture state.

7. In an internal combustion engine, a main fuel supply means, a receptacle for auxiliary fuel, fuel delivery means between said receptacle and the intake conduit, a valve in said fuel delivery means normally closing the same, and means for imposing gaseous pressure upon the contents of said receptacle when said fuel delivery means is opened and for venting said receptacle to the atmosphere when said fuel delivery means is closed.

8. In an internal combustion engine, a receptacle for auxiliary fuel having an outlet at the lower end thereof within the intake manifold of the engine to permit of the flow of fuel into the manifold by gravity, means for controlling said outlet, means for supplying a gas under pressure to said receptacle above the fuel therein, and means operated with said outlet controlling means for controlling said last named means, whereby to impose a gaseous pressure on the fuel in said receptacle for supplementing the action of gravity thereon.

9. In an internal combustion engine, a fuel receptacle having a nozzle extending directly into the intake manifold and having a plurality of relatively small orifices therein directed towards the several inlet valve ports, means for controlling the passage of fuel through said nozzle, means for supplying a gas under pressure to said receptacle above the fuel therein, and means for releasing said gas to effect the passage of said fuel under gaseous pressure through said orifices and the delivery thereof at points adjacent to said ports.

10. In an internal combustion engine, a principal source of fuel supply, an auxiliary fuel receptacle, means for controlling the admission of fuel from said principal source of supply to said receptacle, means for controlling the admission of fuel from said receptacle to the intake conduit of the engine, means for supplying a gas under pressure to said receptacle above the fuel therein, and means for controlling the pressure imposed upon the fuel within said receptacle.

11. In an internal combustion engine, a principal source of fuel supply, an auxiliary fuel receptacle, means for controlling the admission of fuel from said principal source of supply to said receptacle, means for controlling the admission of fuel from said receptacle to the intake conduit of the engine, means for controlling the pressure within said receptacle, and means for actuating said several fuel controlling means in opposite directions successively, and for actuating said pressure controlling means.

12. In an internal combustion engine, a principal source of fuel supply, an auxiliary fuel receptacle, a valve between said principal source of fuel supply and said receptacle, a valve between said receptacle and the intake conduit of the engine, actuating means connecting said valves for closing one thereof and opening the other thereof successively, valve controlled means for the admission of the gases and products of combustion from the engine cylinders under pressure to said receptacle, and a lost-motion connection between said actuating means and said valve controlled means, whereby to supply said gases and products of combustion to said receptacle when the same is in communication with said intake conduit.

13. In an internal combustion engine, a principal source of fuel supply, an auxiliary fuel receptacle, a valve controlling the passage of fuel between said principal source of supply and said receptacle, a valve for controlling the admission of fuel from said receptacle to the intake conduit of the engine, actuating means connecting said valves for closing one thereof and opening the other thereof successively, and means associated with said actuating means for supplying gases under pressure to said receptacle when the same is in communication with said intake conduit, and serving to vent said receptacle to the atmosphere when the positions of said valves are reversed.

14. In an internal combustion engine, a fuel receptacle communicating with the intake conduit of the engine for supplying fuel thereto, and with the cylinders thereof for supplying the gases and products of combustion to said receptacle above the head of fuel therein, means for controlling the admission of fuel to said intake conduit, and means for controlling the admission of gases and products of combustion to said receptacle.

15. In an internal combustion engine, a fuel receptacle communicating with the intake conduit of the engine for delivering fuel thereto and with the cylinders thereof for imposing the pressure of the gases and products of combustion therefrom upon the fuel in said receptacle, valve means for controlling the admission of fuel to said intake conduit, means for controlling the admission of gases and products of combustion to said receptacle, and means connecting said several controlling means for actuating the same by a single operation.

16. In an internal combustion engine, a fuel receptacle communicating with the intake conduit of the engine for supplying fuel thereto and with the cylinders thereof for supplying the gases and products of combustion under pressure to said receptacle above the fuel therein, means for controlling the admission of fuel from said receptacle to the intake conduit of the engine, means for controlling the admission of said gases and products of combustion under pressure to said receptacle, a pressure storage chamber in the line of communication between said engine cylinders and said pressure controlling means, a relief valve associated therewith, and a check valve in said line of communication between said chamber and said cylinders.

17. In an internal combustion engine, a principal source of fuel supply, an auxiliary fuel receptacle communicating therewith and with the intake conduit of the engine, means for supplying gases under pressure to said fuel receptacle, reciprocating valve members interposed in the passages between said receptacle and said principal source of fuel supply and said intake conduit, a link pivotally connected at one end and an intermediate portion to said valve members for actuating the same in opposite directions successively, and a reciprocating valve member for controlling the admission of gases under pressure to said receptacle having a lost-motion connection with the other end of said link and actuated thereby after said receptacle is in closed relation to said principal source of fuel supply; said last-named valve member in one position thereof serving to vent said fuel receptacle to the atmosphere.

18. The hereindescribed method of supplying fuel to internal combustion engines which consists in supplying air and main fuel to the engine, and upon acceleration simultaneously releasing a quantity of fuel and cylinder gases under pressure developed as a result of engine operation, and subjecting said fuel to the action of the released gases for effecting delivery of the fuel into the air stream.

19. The hereindescribed method of supplying fuel to internal combustion engines which consists in imposing the pressure of the cylinder gases upon a head of auxiliary fuel, and delivering said fuel into the intake manifold in streams directed towards the several inlet valve ports for supplying small amounts of fuel to the several ports at points in close proximity thereto substantially simultaneously, and replenishing said fuel under atmospheric pressure at the intervals between deliveries thereof to the engine.

20. In an internal combustion engine, an intake conduit, means for supplying main fuel thereto, means for controlling the air supply thereto, means for supplying auxiliary fuel thereto, means operated by the control of said air supply for controlling the passage of auxiliary fuel to said intake conduit, and means for subjecting the auxiliary fuel upon the opening of the passage thereof to the action of a gas under pressure for effecting delivery of said auxiliary fuel.

21. In an internal combustion engine, an intake conduit, means for supplying main fuel thereto, means for controlling the air supply thereto, means for supplying auxiliary fuel thereto, means for supplying a gas under pressure to said auxiliary fuel supplying means, and means operated by the control of the air supply for controlling the passage of auxiliary fuel to the intake conduit and simultaneously rendering said gas active thereon for effecting delivery of said auxiliary fuel.

22. In an internal combustion engine, an intake conduit, a fuel receptacle adapted to communicate with the intake conduit of the engine, means for supplying a gas under pressure to said receptacle above the head of fuel therein, a valve for controlling the discharge of fuel from said receptacle, a valve for controlling the admission of said gas thereto, and means for simultaneously actuating said valves.

23. In an internal combustion engine, an intake conduit, a main fuel delivery means, air controlling means, means operable to supplement engine induction in causing discharge of auxiliary fuel into the intake conduit, a valve for controlling the passage of auxiliary fuel thereto, and throttle operated means for operating said induction supplementing means, and for opening said valve to discharge auxiliary fuel into the intake conduit by augmented pressure.

24. An internal combustion engine, an intake conduit, a main fuel supply means, air controlling means, auxiliary fuel supply means, means for subjecting the auxiliary fuel to the action of a gaseous fluid for effecting the delivery of said auxiliary fuel into the intake conduit under an augmented pressure difference, means for controlling the passage of auxiliary fuel and gaseous fluid, and means for actuating said last named controlling means upon opening movement of the air controlling means; said actuating means being unidirectionally operative to prevent actuation of said controlling means to admit auxiliary fuel upon closing movement of the air controlling means.

25. In an internal combustion engine, an intake conduit, a main fuel delivering means, means for controlling the air supply, an auxiliary fuel supplying means, a source of gaseous fluid under pressure, valvular means for controlling the passage of auxiliary fuel to the intake conduit, valvular means for controlling said gaseous fluid supply, and means operated by the air controlling means for actuating said several valvular means to release the auxiliary fuel and render said gaseous fluid active thereon to effect delivery of auxiliary fuel into the intake conduit.

26. In an internal combustion engine, an intake conduit, a main fuel delivering means, a throttle, an auxiliary fuel supplying means, means for conducting a gaseous fluid under pressure to said auxiliary fuel supplying means, valves controlling the discharge of said auxiliary fuel and the passage of said gaseous fluid, a member connected to said valves, a unidirectionally acting means yieldably carried by said member, and throttle operated actuating means movable over said unidirectionally acting means in operative relation thereto at an interval during opening movement of the throttle for actuating said valves to deliver auxiliary fuel under a pressure difference augmented by the action of the gaseous fluid, and movable relative to said unidirectionally acting means in inoperative relation thereto upon closing movement of the throttle for preventing actuation of said valves.

27. In an internal combustion engine, an intake conduit, a main fuel delivering means, a throttle, an auxiliary fuel supplying means, means for conducting cylinder gases from the engine cylinders to said auxiliary fuel supplying means, valves controlling the discharge of said auxiliary fuel and the passage of said cylinder gases, a member connected to said valves, a unidirectionally acting means yieldably carried by said member, and throttle operated actuating means movable over said unidirectionally acting means in operative relation thereto at an interval during opening movement of the throttle for actuating said valves to inject into the intake conduit auxiliary fuel under a pressure difference augmented by the action of the cylinder gases, and movable relative to said unidirectionally acting means in inoperative relation thereto upon closing movement of the throttle for preventing actuation of said valves.

28. In an internal combustion engine, an auxiliary fuel receptacle, a source of gaseous fluid under a potentially available pressure adapted to communicate with said receptacle above the fuel therein, means for supplying fuel to said receptacle, and means for releasing said gaseous fluid to render the pressure thereof active on the fuel in said receptacle to discharge the same therefrom into the engine, and for shutting off said gaseous fluid to reduce the pressure in the receptacle to permit of fuel replenishment.

29. In an internal combustion engine, a principal source of fuel supply, an auxiliary fuel receptacle having a vent to atmosphere, a source of gaseous fluid under pressure adapted to communicate with said receptacle, means for controlling the inlet and outlet to and from said receptacle, and operable to open one thereof and close the other thereof and vice versa, and means operated with said last named means for controlling said vent and the passage of gaseous fluid to said receptacle, and serving to close said vent and admit said gaseous fluid to said receptacle when said outlet is open and to shut off said gaseous fluid and open said vent when said inlet is open.

30. The hereindescribed method of supplying fuel to internal combustion engines which consists in delivering the main fuel into the air passing to the cylinders, and, upon acceleration, imposing a gaseous pressure upon a head of auxiliary fuel and effecting the delivery thereof into the main fuel and air at a point separate from the point of introduction of main fuel.

31. The hereindescribed method of supplying fuel to internal combustion engines which consists in introducing main fuel into the air passing to the cylinders, and, upon acceleration, simultaneously releasing a quantity of supplementary fuel and gases under pressure, and subjecting said supplementary fuel to the action of the released gases for causing delivery of said supplementary fuel into the main fuel and air stream passing to the cylinders for enriching the same.

32. The hereindescribed method of supplying fuel to internal combustion engines which consists in inducing main fuel into the air passing to the cylinders, and, upon acceleration, releasing a quantity of supplementary fuel and subjecting the same to the action of a gas under pressure for causing the supplementary fuel to be delivered into the main fuel and air stream to compensate for main fuel impoverishment.

33. The hereindescribed method of supplying fuel to internal combustion engines which consists in inducing main fuel into the air passing to the cylinders, controlling the passage of the mixture to the engine cylinders, and, upon acceleration, releasing a quantity of supplementary fuel subject to the action of a gas under pressure, and delivering the supplementary fuel thereby into the charge stream at a point beyond the throttling point.

34. The hereindescribed method of supplying fuel to internal combustion engines which consists in inducing main fuel into the air passing to the cylinders, and, upon acceleration, releasing a gas under pressure, subjecting supplementary fuel to the action of the released gases, and causing thereby the delivery of the supplementary fuel into the main fuel and air stream at a point separate from the point of introduction of the main fuel.

35. The hereindescribed method of supplying fuel to internal combustion engines which consists in inducing main fuel into the air passing to the cylinders, throttling the mixture, and, upon acceleration, releasing a quantity of supplementary fuel to allow the flow thereof by gravity into the charge stream at the engine side of the throttling point, and subjecting the supplementary fuel to the action of a gas under pressure for augmenting gravity in causing fuel flow.

ARLINGTON MOORE.